United States Patent [19]

Leane et al.

[11] 3,911,355

[45] Oct. 7, 1975

[54] NMR SPECTROMETER PROBE WITH EDDY CURRENT BRAKE

[75] Inventors: John Bryant Leane, Beaconsfield; Peter Higham, High Wycombe, both of England

[73] Assignee: Perkin-Elmer Limited, Beaconsfield, England

[22] Filed: May 16, 1974

[21] Appl. No.: 470,684

[30] Foreign Application Priority Data
May 21, 1973 United Kingdom............... 24065/73

[52] U.S. Cl. ........................... 324/.5 AH; 324/0.5 A
[51] Int. Cl.² ........................................ G01R 33/08
[58] Field of Search ......... 324/0.5 R, 0.5 A, 0.5 AH

[56] References Cited
UNITED STATES PATENTS

| | | | |
|---|---|---|---|
| 3,091,732 | 5/1963 | Anderson et al............... | 324/0.5 AH |
| 3,681,683 | 8/1972 | Huber.......................... | 324/0.5 AH |

*Primary Examiner*—Alfred E. Smith
*Assistant Examiner*—Michael J. Tokar
*Attorney, Agent, or Firm*—F. L. Masselle; S. A. Giarratana; J. K. Conant

[57] ABSTRACT

Disclosed is a sample spinning system for an NMR Spectrometer, the system comprising an electrically conductive device mounted for rotation with a spinnable sample tube and arranged to interfere in operation with stray magnetic field in the working gap of the spectrometer to produce an eddy current breaking effect. There is also described a spinner assembly comprising an air-turbine rotor in addition to the electrically conductive device and a probe adapted to be moved into and out of the working gap, the spinning system forming part of the probe.

9 Claims, 1 Drawing Figure

U.S. Patent  Oct. 7,1975  3,911,355
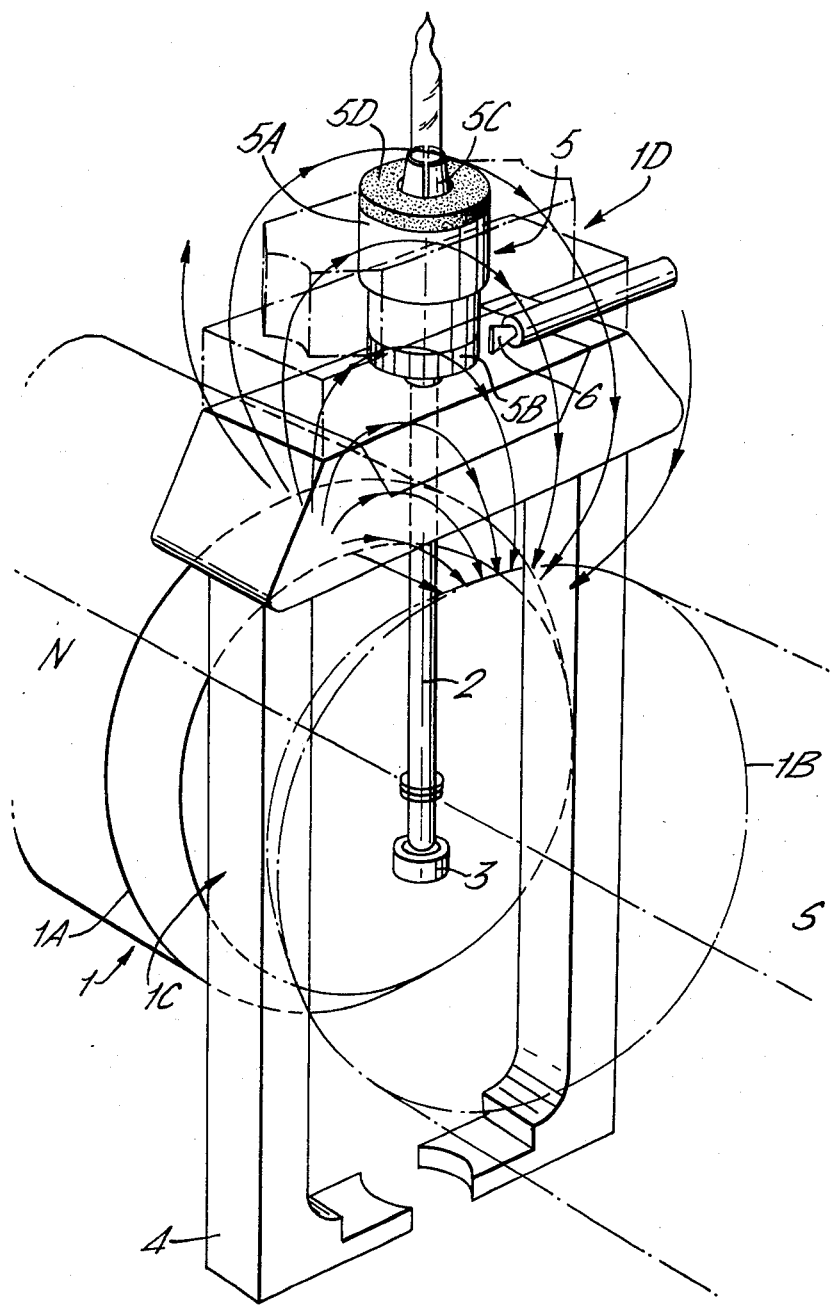

NMR SPECTROMETER PROBE WITH EDDY CURRENT BRAKE

This invention relates to apparatus wherein a spinnable member as hereinafter defined is required to be rotated at substantially steady speeds around an axis of rotation intersecting the axis of a magnetic field set up in working gap extending between two opposed poles of a magnet which as a result of the gap gives rise to a considerable stray magnetic field barrelling out from pole to pole.

A type of apparatus exemplifying the field of application of the present invention is a Nuclear Magnetic Resonance (NMR) Spectrometer provided with sample spinning facilities. In the description which follows, we shall make reference to this specific application, in the interest of a clearer appreciation of the inventive features herein disclosed.

In a known NMR spectrometer, a sample holder in the form of an elongated test tube of small diameter is pivotally mounted within a probe slidable along guideways into and out of the working gap of a permanent magnet providing the polarizing field necessary for the NMR analysis. The sample to be analysed is located at the bottom of the tube, the registration of the mechanical parts being so arranged that in operation the centre of the column of sample approximately coincides with the magnetic axis of the polarizing field. The sample holder may be spun around its longitudinal axis by fitting thereto a small concentric turbine which comes close to a stationary nozzle when the holder is in position within the probe.

It is usual in NMR work to refer to sample spinning frequency in cycles per second rather than spinning speed in revolutions per minute. It is well known that NMR line narrowing as a result of magnetic field inhomogeneities being minimized by sample spinning is effective when such frequency is greater than the line width measured in cycles per seconds on the NMR frequency spectrum.

Sample spinning inevitably sets up spinning sidebands spaced apart by the spinning frequency. At frequencies near the lower limit, the sidebands are close to the centreband, i.e. the NMR resonance of interest, and cover an area of the same order of magnitude as that of the centreband, the sum of the two areas remaining constant for all frequencies. As the frequency is increased, the sidebands area becomes progressively squatter and smaller as the centreband area increases by elongation and narrows at the same time. Since narrowing and heightening of the NMR line, increased separation and minimization of the sidebands are all very desirable results, there is much to be gained from stepping up the frequency to the point where the sidebands area is as small as desired. On the other hand, at any chosen frequency there is a need for maintaining a reasonably tight control of such frequency, particularly where quantitive work is involved. Where the integral of the NMR signal is required, the sidebands area is integrated together with that of the centreband. This can be allowed for only if the sidebands area is not subject to changes due to spinning frequency changes.

In addition to the stabilization of the spinning frequency there is a requirement for slight adjustments in frequency. It may so happen that a sideband is obscuring a weak NMR line. A slight frequency shift can put the matter right by either increasing or decreasing sidebands separation, whichever is more appropriate.

It is thus seen that an NMR spinning system calls for a rotating assembly which can be kept in good dynamic balance around the operational spinning frequency and this naturally implies a comparatively vibration free motion with a minimum of frictional resistance.

In some present commercial designs friction has been minimized by the use of air bearings but, no matter how frictionless the support for the rotating assembly is, it is difficult to guard against spinning frequency disturbances caused by foreign particles of matters interfering with the support system.

Very small particles can cause comparatively large frequency modulation simply because the air flow required for spinning an almost frictionless rotating assembly is very small, which means that the torque is also small and, therefore, easily affected.

The obvious answer is to apply some form of braking to ensure that the operational frequency is attained with increased air flow at the turbine and, consequently, an increased torque acting on the rotating assembly in relation to which any disturbing resistance would be negligible.

Friction brakes were tried with little success, mainly because it is very difficult to maintain a constant coefficient of friction. Air damping by means of air vanes forming part of the rotating assembly has been used in commercial designs, but the stabilizing effect of the vanes tends to be inadequate because considerations of space, convenience, fragility, rule out the adoption of vanes with a sufficiently large surface area. Furthermore, the effect of aerodynamic braking increases with the square of the air velocity, which, although very good from the viewpoint of spinning frequency stabilization, does not allow the frequency to be adjusted with ease around the nominal operational value.

It would naturally be possible to sense the frequency of the rotating assembly and to control the air flow to the turbine by means of a servo system so as to achieve and maintain any desired frequency within a given range. This solution is costly, especially in relation to the fact that in any given NMR instrument the frequency adjustments required need only cover a very small range.

Eddy current braking as used in electric supply meters would on the face of it offer considerable advantages since the size of the rotating conductive member required can be kept small by providing a sufficiently intense braking magnetic field. Unfortunately, the braking magnetic intensity required in a region so close to the working gap would spoil the resolution of the NMR polarizing magnet. We have found, that no separate braking magnet need in fact be used because the stray field barrelling out from the pole pieces of a powerful polarizing magnet such as required for high resolution NMR can be used as the braking magnetic field.

According to the present invention there is provided an apparatus, comprising a powerful magnet having a pair of opposed magnetic poles defining a working gap therebetween which allows a considerable stray magnetic field to barrel out from pole to pole and a spinning system having means for supporting a spinnable member for rotation around an axis intersecting the magnetic field in said gap and, consequently, the stray magnetic field, said spinning system comprising an electrically conductive device mounted for rotation with said spinnable member and arranged to interfere in operation with said stray magnetic field to produce an eddy current braking effect.

According to the invention there is also provided a spinner assembly adapted for use in said apparatus and comprising an air-turbine rotor in addition to said electrically conductive device, or a device combining both functions, the spinner assembly being adapted to be fitted by the user to said spinnable member.

According to the invention there is also provided a probe adapted to be slid into and out of said working gap in said apparatus, said spinning system forming part of said probe.

In the present context, a spinnable member is intended to refer to a member the nature of which in terms of material, geometry, weight, mass distribution and so forth, coupled with the intensity of the stray magnetic field, allow it to be spun by the application of a torque in comparison with which the braking torque that can be applied by eddy current effect in accordance with the present invention is significant.

A practical realization of the invention in which the apparatus is an NMR spectrometer will now be described with reference to the attached informal drawing. The opposed magnetic poles 1A and 1B of a polarizing magnet indicated generally at 1 define a working gap 1C extending therebetween from pole face to pole face. With a gap length of 14mm a main field intensity of 21.14 kilogauss in a a barrel magnet in which the pole caps were frusto-conical in shape tapering from a major diameter of 110mm to a minor diameter of 67mm, we have found that the stray field measured well over 1 kilogauss some 13cm from the geometric centre of the working gap. The general configuration of the barrelling out stray field is shown at 1D.

A spinnable member in the form of a glass sample tube 2 having a cylindrical outer surface held within close geometric limits is located between the magnetic poles 1A and 1B, the bottom end of the tube, which is closed, being positioned, say, a centimetre or so below the magnetic axis and the longitudinal axis thereof intersecting said magnetic axis perpendicularly at approximately the magnetic centre of the working gap.

The bottom of the tube 2 is pivotally supported and endwise located by an end bearing 3, radial support and location being provided by an air bearing (not shown) co-operating with the outer surface of tube 2 at a distance of some 10cm from bearing 3, both bearings forming part of a probe structure outlined at 4.

A spinner assembly 5 comprises a generally cylindrical spinner body 5A in the form of a plastic moulding in which there are integrally defined the air turbine 5B at the bottom end and the segmented tapered projection 5C at the top end. Over the segmented projection 5C fits a thick aluminum washer 5D, the two being adapted for snap fastening of the washer 5D to the body 5A. An axial bore nominally of the same diameter as the external diameter of the tube 2 and extending through the projection 5C permits the tube 2 to be slid into the body 5A and retained at a predetermined position by the resilient pressure exerted on the wall of the tube 2 by the springiness in the segments of projection 5C, the axial bore through the body 5A being slightly reduced through the projection 5C so that the sements must open out slightly to allow the tube 2 to pass therethrough. At the bottom end, the axial bore is recessed to accept an O-ring (not shown) sealing the tube 2 to the bore and at the same time augmenting the retaining action of the segments in projection 5C.

When the spinner assembly 5 is suitably located along the length of the tube 2 (the user after passing the tube 2 through the spinner body 5A need only grasp the spinner body 5A, insert the tube 2 in an annular stop located at a predetermined distance from an end stop for the tube 2 and press the spinner body in contact with the annular stop) the turbine 5B comes close to an air supply (not shown). Through the coaction of the nozzle 6, turbine 5B and the frictional connection between the spinner assembly 5 and the tube 2, the latter may be spun at the desired operational frequency by adjusting the air supply to the nozzle 6.

It will be observed that the aluminium washer 5D is traversed by the magnetic lines of force of the stray magnetic field 1D, which means that eddy currents will be induced in the washer tending to oppose the rotational torque provided by the air turbine action to an extent which is substantially linear with rotational speed. The thickness of the washer 5D with any given value of stray field and washer diameter naturally determines the effectiviness of the washer as an electrodynamic brake. We have found that for given practical settings of air delivery at the nozzle 6 it is possible to select a geometry of the washer 5D giving an eddy current braking torque which will just balance the air turbine torque at a given speed. Best stabilization of frequency coupled with a useful range of frequency adjustment appears to result from achieving limiting conditions at a frequency slightly above the highest operational frequency required.

In a stray field of 1.7 kilogauss 13cm from working gap centre, we have successfully used an aluminium washer having a thickness of 4.5mm and a diameter of 19mm when the limiting conditions with an air pressure of 12 psi and an air flow of 4 litres per minute were reached around a frequency of 35 cycles. The turbine 5B was 18mm in diameter and 18 slanted saw-tooth shaped blades were provided, each blade measuring 2mm across the base, 3mm from apex to base and 4mm in height. The nozzle 6 was slit-shaped, with an orifice length of 3mm and a width of 0.1mm. It was spaced 2mm from the turbine.

Although the eddy current brake was made separate from the turbine, it would naturally be possible but less convenient in production to make use of an electrically conductive turbine performing both the spinning and the braking functions.

The above dimensions apply when a standard sample tube is used having an outside diameter of 5mm. If sample tubes of larger diameter are called for to increase the volume of sample "seen" by the NMR receiver coil and hence improve NMR sensitivity, the spinning frequency must be reduced to avoid vortex problems. Thus, whether to keep clear of vortexes or for quite different overriding reasons associated, for example, with NMR physics, frequencies of 10 cycles or under may become necessary, at which spinning stabilization is notoriously difficult, unless a servo system is used. In particular, air vanes become completely unsatisfactory for the reasons mentioned earlier on. The present invention offers an elegan solution: all that is required is a suitably proportioned eddy current braking device, which in the practical embodyment described simply means increasing the thickness and possibly the diameter of the aluminium washer 5D.

With the compressed air supply normally used for sample spinning purposes in NMR it is possible to produce a practical eddy current brake in accordance with the present invention which even when the compressor is fully loaded will produce a limiting frequency of only a few cycles. It is doubtful whether this could ever be achieved with aerodynamic braking without an itolerably cumbersome construction.

It is indeed surprising that eddy current braking of the spinning sample tube by making use of the stray field of the NMR magnet can be made so effective without at the same time marring resolution of the observed NMR resonance.

We said earlier that it would be possible to combine the functions of the turbine and eddy current brake by making the turbine in an electrically conductive material. It in so doing a limitation is imposed on the volume of metal that can be tolerated where it is most effective as a brake, i.e. at the periphery of the dual function rotor, the difficulty can be overcome by selecting a metal of suitably high resistivity, e.g. constantan, of which a comparatively larger critical volume can be used for a given braking effect. There is of course no need to confine the choice of the material to metals: other electrically conductive materials may be used as long as they are sufficiently nonmagnetic in an NMR context.

It is no doubt appreciated that an air turbine need not be generally cylindrical. It could equally well be conical or of some other convenient shape and it does not have to be provided with blades. A plain cylinder can be spun round by a tangentially disposed jet. It likewise follows that depending on the shape and arrangement of the turbine (whether performing the dual function or not) it is possible to generate not only a spinning torque but also a lift component in a spinning system entirely supported on air.

Another embodiment of the present invention which we have found quite satisfactory in practice simply comprises an electrically conductive slug positioned within the sample tube of the NMR probe externally of the volume of magnetic field within which the sample is accommodated. It is with great surprise that we have discovered how close the slug can be positioned to the boundary of said volume without causing undesirable magnetic field disturbances at the sample. The eddy-current braking effect is of course particularly effective within the working gap because there the magnetic intensity is at its highest. By arranging for the slug to be retained at any desired position along the length of the sample tube, e.g. by some frictional means, and attaching a stem to the slug, the user is enabled to control quite easily the braking effect: generally lowering the stem will increase the effect and raising it will decrease it. The slug may be completely solid for maximum effect or annular. An annular slug intended for lowering within the working gap need not be mounted within the tube; it may equally well be mounted on the outside, with some limitation of course, and an extension may be provided for controlling its location as in the case of the internal slug.

What we claim is:

1. In a gyromagnetic resonance spectrometer provided with means for spinning a longitudinally extending sample holder around its longitudinal axis transversally to the lines of force extending between two opposed magnetic poles defining the working gap of a polarizing magnet, the combination with said sample holder of an eddy-current brake device mounted for rotation with the sample holder in the magnetic field external to the magnetic field volume within which the sample is to be accommodated, said device tending to stabilize sample spinning speed by virtue of the electromagnetic coupling set up between the spinning device and the magnetic field without causing significant magnetic field disturbances at the sample.

2. The combination of claim 1, wherein said device is an electrically conductive generally cylindrical member.

3. In a nuclear magnetic resonance (NMR) spectrometer provided with means for spinning a longitudinally extending sample holder within a probe around its longitudinal axis transversally to the lines of force extending between two opposed magnetic poles defining the working gap of a polarizing magnet, the combination with said probe, said sample holder and said magnet of an eddy-current brake device mounted for rotation with the sample holder in the magnetic field external to the magnetic field volume of the working gap within which the NMR sample is to be accommodated, said device tending to stabilize sample spinning speed by virtue of the electromagnetic coupling set up between the spinning device and the magnetic field without causing significant magnetic field disturbances at the sample.

4. The combination of claim 3, wherein said device is an electrically conductive generally cylindrical member.

5. The combination of claim 4, wherein said device is positioned within the sample holder.

6. The combination of claim 5, wherein means are provided for enabling the position of the device to be adjusted by the user without having to remove the sample holder from the probe.

7. The combination of claim 4, wherein said device is positioned on the outside of the sample holder.

8. In a nuclear magnetic resonance spectrometer provided with means including an air-turbine rotor assembly mounted on a longitudinally extending sample holder for spinning said sample around its longitudinal axis transversally to the lines of force extending between two opposed magnetic poles defining the gap of a polarizing magnet, the combination with said assembly of an eddy-current brake device mounted on said assembly for rotation with the sample holder in the stray field barrelling out from the poles, said device tending to stabilize sample spinning speed by virtue of the electrogmagnetic coupling set up between the spinning device and the magnetic field without causing significant magnetic field disturbances at the sample.

9. The combination as claimed in claim 8, wherein said assembly is a plastic moulding and the eddy-current brake device is an electrically conductive generally annular member forming part of said assembly.

* * * * *